(12) United States Patent
Wu

(10) Patent No.: US 8,249,624 B2
(45) Date of Patent: Aug. 21, 2012

(54) POSITIONING METHOD AND SYSTEM IN TWO OR MORE CELLULAR NETWORKS

(75) Inventor: Tao Wu, Shanghai (CN)

(73) Assignee: Spreadtrum Communications (Shanghai) Co., Ltd., Pudong District, Shanghai (CN)

( * ) Notice: Subject to any disclaimer, the term of this patent is extended or adjusted under 35 U.S.C. 154(b) by 712 days.

(21) Appl. No.: 12/273,555

(22) Filed: Nov. 19, 2008

(65) Prior Publication Data

US 2009/0286552 A1 Nov. 19, 2009

(51) Int. Cl.
*H04W 24/00* (2009.01)
(52) U.S. Cl. ............ 455/456.2; 455/456.1; 455/422.1
(58) Field of Classification Search ........ 455/456.1, 455/456.2
See application file for complete search history.

(56) References Cited

U.S. PATENT DOCUMENTS

| | | | |
|---|---|---|---|
| 7,254,401 B2 * | 8/2007 | Keranen et al. ............ 455/456.1 |
| 2002/0086682 A1 * | 7/2002 | Naghian ........................ 455/456 |
| 2004/0102195 A1 * | 5/2004 | Naghian et al. ............ 455/456.1 |
| 2004/0203882 A1 * | 10/2004 | Laiho et al. ................ 455/456.1 |
| 2004/0259565 A1 * | 12/2004 | Lucidarme .................... 455/453 |

* cited by examiner

*Primary Examiner* — Kent Chang
*Assistant Examiner* — Isaak R Jama

(57) ABSTRACT

A positioning method in two or more cellular networks calculates a gradient (grad (J)) of an optimization function for estimating position of UE:

$$J = \sum_{j=1}^{N_s} w^j \sum_{i=1}^{N^j} w_i^j [(\|X - X_0^j\| - \|X - X_i^j\|) - c\Delta t_i^j]^2,$$

wherein $X_0^j$ is the position of a reference cell of the jth network, $X_i^j$ is the position of the ith cell of the jth network, $W_i^j$ is the weight directly proportional to the downlink signal receiving intensity of the ith cell of the jth network, $w^j$ is the weight inversely proportional to the signal code continuing time of the jth network, $\|x-x_0\|=\sqrt{(x-x_0)^2+(y-y_0)^2+(z-z_0)^2}$ is the Euclidian distance, $N^j$ is the number of non-reference cell of the jth network, Ns is the number of networks, c is the speed of light.

16 Claims, 9 Drawing Sheets

POSITIONING METHOD AND SYSTEM IN TWO OR MORE CELLULAR NETWORKS

BACKGROUND OF THE PRESENT INVENTION

1. Field of Invention

The present invention relates to a positioning method and system, and more particularly to a positioning method and system that utilize the transmission time from the base stations in two or more cellular networks to the targeted mobile respectively to estimate the position of the mobile phone.

2. Description of Related Arts

With the development of the mobile communication technique, especially after US demands for emergency location services, positioning services are getting more and more attention in the industry.

Depending on whether active participation of mobile phone is required or not, the positioning technique in cellular communication systems is classified into two categories: positioning technique requiring information submission from the targeted mobile phone and positioning technique requiring no information submission from the targeted mobile phone.

As to the former technique, the positioned statement of the targeted mobile phone can be determined by sending control signaling to the mobile phone and receiving relevant measurement reports actively reported by the mobile phone. So the mobile phone can figure out when it is being positioned. And the mobile phone can prevent from being positioned by not reporting relevant measurements or reporting false information, so as to protect its position information.

However, as to the latter technique that requires no active participation of mobile phone, the mobile phone cannot determine whether it is being positioned or not, which causes difficulty to protect the position information. A typical technique of this category is the positioning method based on cell ID.

According to the reference signals, the positioning technique is mainly classified into three categories: the positioning technique based on severing cell ID for the targeted mobile phone, the positioning technique based on the base station(s) and the targeted mobile phone signals, and the positioning technique based on the satellite navigation system(s). The positioning technique based on cell ID for the targeted mobile phone has poor accuracy; the positioning technique based on satellite navigation system(s) requires extra components and cost, and the positioning technique based on the base station and the targeted mobile phone signals basically do not require extra components with moderate accuracy.

The traditional positioning technique based on the base station and mobile phone signal transmission time, such as U.S. Pat. No. 5,600,706, is illustrated in FIG. 1. The positioning system requires at least three base stations 111-113 and a mobile phone with measurement function 12. The transmission time of the wireless signal between the base station 111-113 and mobile phone 12 is t1, t2 and t3 respectively. As the velocity of radio waves is equal to the speed of light (c), the distance between the mobile phone and the respective base station is $d_i = t_i * c$ (i=1, 2 . . . ). Draw circles 141-143 with the respective base station as center and $d_i$ as radius, and the intersection point of the circles is where the targeted mobile phone is. The mobile phone measures the transmitting-receiving time delay of the base station and reports it to the network, and the network can calculate the location of the mobile phone based on the measurement data.

Due to the obstruction such as building block between the mobile phone and the base station, the sight of light rarely exists in the real network. As shown in FIG. 2, a building 23 stands between the base station 21 and the mobile phone 22, so there is no LOS (Light Of Sight) 24 between them. At the same time, another building 25 reflects the base station signal to the mobile phone 22, so there is a signal transmission path 26 between the base station and the mobile phone. According to the principle of the total length with two sides being greater than the third in any triangle, the calculated value of radius is greater than the real value, which causes the inaccuracy in determining the mobile phone location. At present, a few processing methods based on indirect path detection and positioning system with indirect path have been developed.

The 3G (3rd Generation) mobile communication system is being applied or will be applied in the most countries and regions in the world. The 3GPP (3rd Generation Partnership Project), as the 3G standards organization, has completed all works on standards. In the positioning aspect in the cellular communication systems, taking suggestions from all companies, the 3GPP adopts all of the three positioning methods: the positioning technique based on cell ID of the serving base station, the positioning technique based on the base station and mobile phone signal transmission time, and the positioning technique based on the satellite navigation system(s).

The measured data submission is requested in the positioning technique based on the base station and the mobile phone signals. The mobile phone measures the signal transmission time between the mobile phone and the base stations and reports it to the network via signaling, and the network estimates the position of the mobile phone.

According to the conclusion of many references, the more base stations that the mobile phone measures, the more accuracy the result is. However, in a real network, due to the cost of the base station and the difficulty for the network planning, the number of the base stations with one certain mobile phone to measure in a real network is limited. As dual-mode or multi-mode mobile phone can receive signals from base stations in different networks, the mobile phone can be positioned in each network. However, it is hard to tell which result is more accurate.

SUMMARY OF THE PRESENT INVENTION

An object of the present invention is to provide a positioning method and system in two or more cellular networks to obtain more accurate positioning estimations.

Another object of the present invention is to provide a positioning method and system in two or more cellular networks, wherein different weights are provided for different networks so as to obtain more accurate positioning results.

Another object of the present invention is to provide a positioning method and system in two or more cellular networks, wherein a formula $$J = \sum_{j=1}^{N_S} w^j \sum_{i=1}^{N^j} w_i^j [(\|X - X_0^j\| - \|X - X_i^j\|) - c\Delta t_i^j]^2$$

is used for estimating the position of a mobile phone.

Another object of the present invention is to provide a positioning system in two or more cellular networks comprising a time difference measuring module in UE and a time delay correction module in SRNC or SAS for collecting information.

Another object of the present invention is to provide a positioning system in two or more cellular networks comprising a position calculating module for estimating the position of a mobile phone.

Accordingly, in order to accomplish the above objects, the present invention provides a positioning method in at least two cellular networks, comprising steps of:

(1) sending a positioning request from CN to SRNC or SAS;
(2) sending the measurement control signaling for measuring receiving time delay between base stations of a serving network from SRNC or SAS to UE;
(3) sending the measurement control signaling for measuring receiving time delay of base stations of other networks from SRNC or SAS to UE;
(4) measuring the receiving time delay by UE, including the differences of receiving time delay between the base stations of the serving network and the receiving time delay of the base stations of other networks;
(5) reporting measurement results of the receiving time delay between base stations of the serving network from UE to SRNC or SAS;
(6) reporting measurement results of the receiving time delay between base stations of other networks from UE to SRNC or SAS;
(7) sending the measurement control signaling for measuring transmitting time delay of base stations from SRNC or SAS to base stations;
(8) measuring the transmitting time delay by base stations, including the transmitting time delay of base stations of the serving network and the transmitting time delay of base stations of other networks;
(9) reporting measurement results of transmitting time delay of base stations of the serving network and transmitting time delay of base stations of other networks from base stations to SRNC or SAS;
(10) estimating the position of the targeted UE by SRNC or SAS in an optimization manner; and
(11) reporting estimation result from SRNC or SAS to CN.

Wherein step (10) further comprising steps of:
(10.1) calculating the time differences of the downlink signals between each cell and a reference cell in each network: $\delta t_i^j = t_i^j - t_0^j$, wherein j is index of the networks, $t_0^j$ is the downlink signal receiving time of the reference cell in the jth system, $t_i^j$ is the downlink signal receiving time of the ith cell, and $\delta t_i^j$ is the time difference between $t_i^j$ and $t_0^j$;
(10.2) calculating correction values of time differences of downlink signals between each cell and reference cell in each network: $\Delta t_i^j = \delta t_i^j - T_{0i}^j$, wherein $T_{0i}^j$ is the time difference of downlink signal transmitting time between the ith cell and reference cell in the jth network, and $\Delta t_i^j$ is correction value of $\delta t_i^j$ and $T_{0i}^j$; and
(10.3) calculating a gradient (grad (J)) of an optimization function for estimating position of UE:

$$J = \sum_{j=1}^{N_s} w^j \sum_{i=1}^{N^j} w_i^j [(\|X - X_0^j\| - \|X - X_i^j\|) - c\Delta t_i^j]^2,$$

wherein $X_0^j$ is the position of reference cell of the jth network, $X_i^j$ is position of the $i^{th}$ cell of the jth network, $W_i^j$ is the weight directly proportional to downlink signal receiving intensity of the ith cell of the jth network, $w^j$ is weight inversely proportional to signal code continuing time of the jth network, $\|x-x_0\| = \sqrt{(x-x_0)^2 + (y-y_0)^2 + (z-z_0)^2}$ is the Euclidian distance, $N^j$ is number of non-reference cell of the $j^{th}$ network, Ns is number of networks, c is the speed of light.

The present invention provides a positioning system in two or more cellular networks, comprising a UE (user equipment), BS (base station), SRNC (Serving Radio Network Controller) or SAS (Stand-Alone Serving Mobile Location Center) and CN (core network) connected one after another, wherein the UE comprises:

a clock module for providing a common timing standard for measuring the time of different networks;
a plurality of synchronization modules of radio access methods for receiving clock synchronization signal from the clock module respectively, capturing synchronization of respective radio access methods, and outputting the time difference of signals of different base stations and time relative to clock synchronization signal;
a time difference measurement module for receiving output of the clock module and synchronization modules, calculating a time difference between transmission time of all base stations of each network to mobile phone and a reference base station, and outputting the time difference; and
a signaling processing module for putting the time difference into signaling and sending it to SRNC or SAS as uplink signaling, wherein the SRNC or SAS comprises:
a time delay correction module of a serving network for calculating signal transmission time delay of base stations of the serving network according to the time difference reported by UE and outputting a result;
a time delay correction module of other networks for calculating signal transmission time delay of base stations of other networks according to the time difference reported by UE and outputting a result;
a storage module for storing positions of base stations of every network; and
a position estimation module receiving the results from the time delay correction module of the serving network and the time delay correction module of other networks for calculating a position of a UE, and outputting a calculation result.

wherein the position estimation module further comprises:
a measurement value correction unit for correcting the time difference reported by UE, and outputting a measurement correction value;
an initial position selection unit for selecting an initial position;
a gradient calculation unit for receiving the measurement correction value and calculating a gradient value;
a position update unit for receiving the initial position from the initial position selecting unit and the gradient value to update an estimated position;
a judgment unit for judging whether a current position estimation meet an accuracy requirement, wherein if yes, the current value is a final position estimation, and the judge unit outputs the final position estimation; if no, the position update unit updates the gradient value; and
a position estimation storing unit for recording the final position estimation.

These and other objectives, features, and advantages of the present invention will become apparent from the following detailed description, the accompanying drawings, and the appended claims.

DETAILED DESCRIPTION OF THE PREFERRED EMBODIMENT

Figure 1:
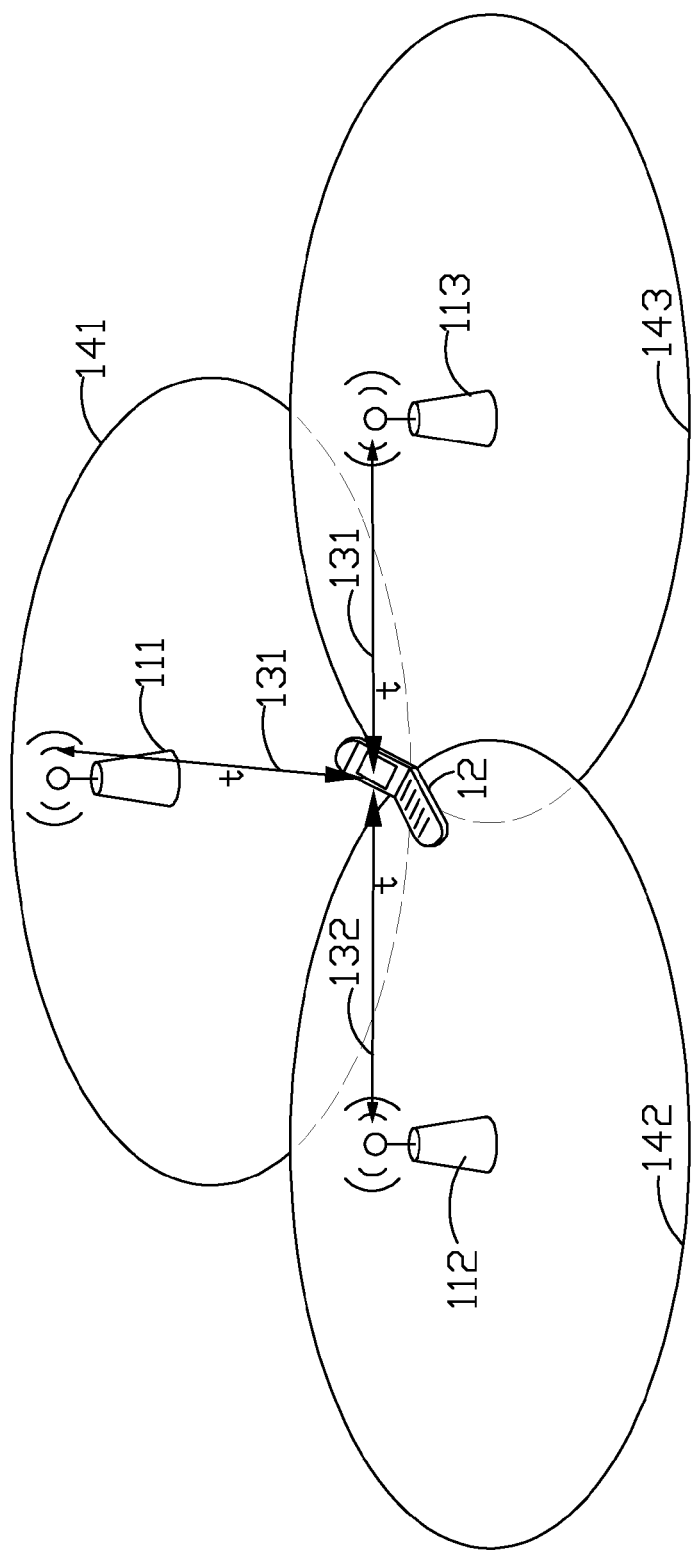
FIG. 1 is a schematic view of a traditional positioning technique based on the base station and mobile phone signals.
Figure 2:
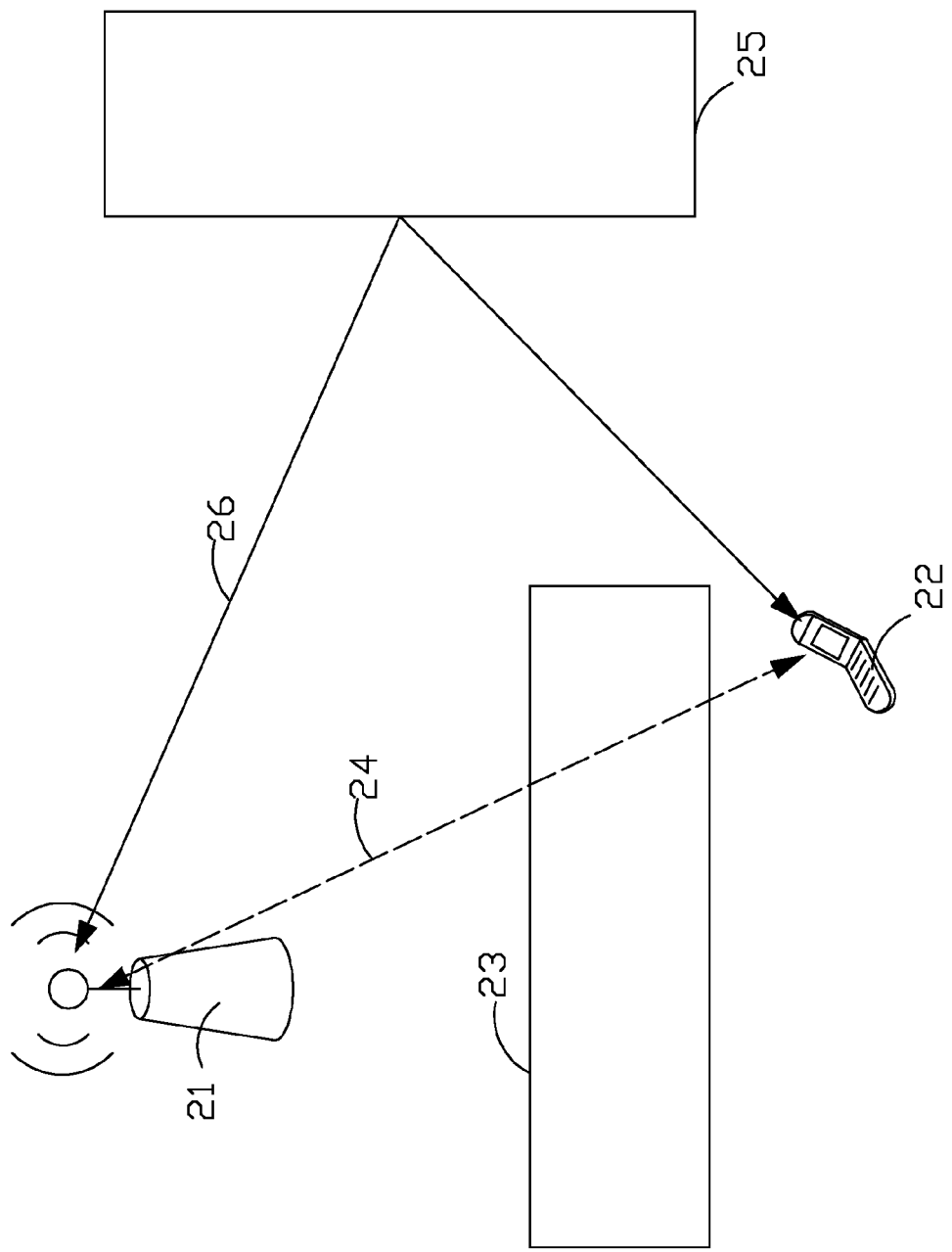
FIG. 2 is another schematic view of a traditional positioning technique based on the base station and mobile phone signals, illustrating a building blocks the direct path between the base station and the mobile phone.
Figure 3:
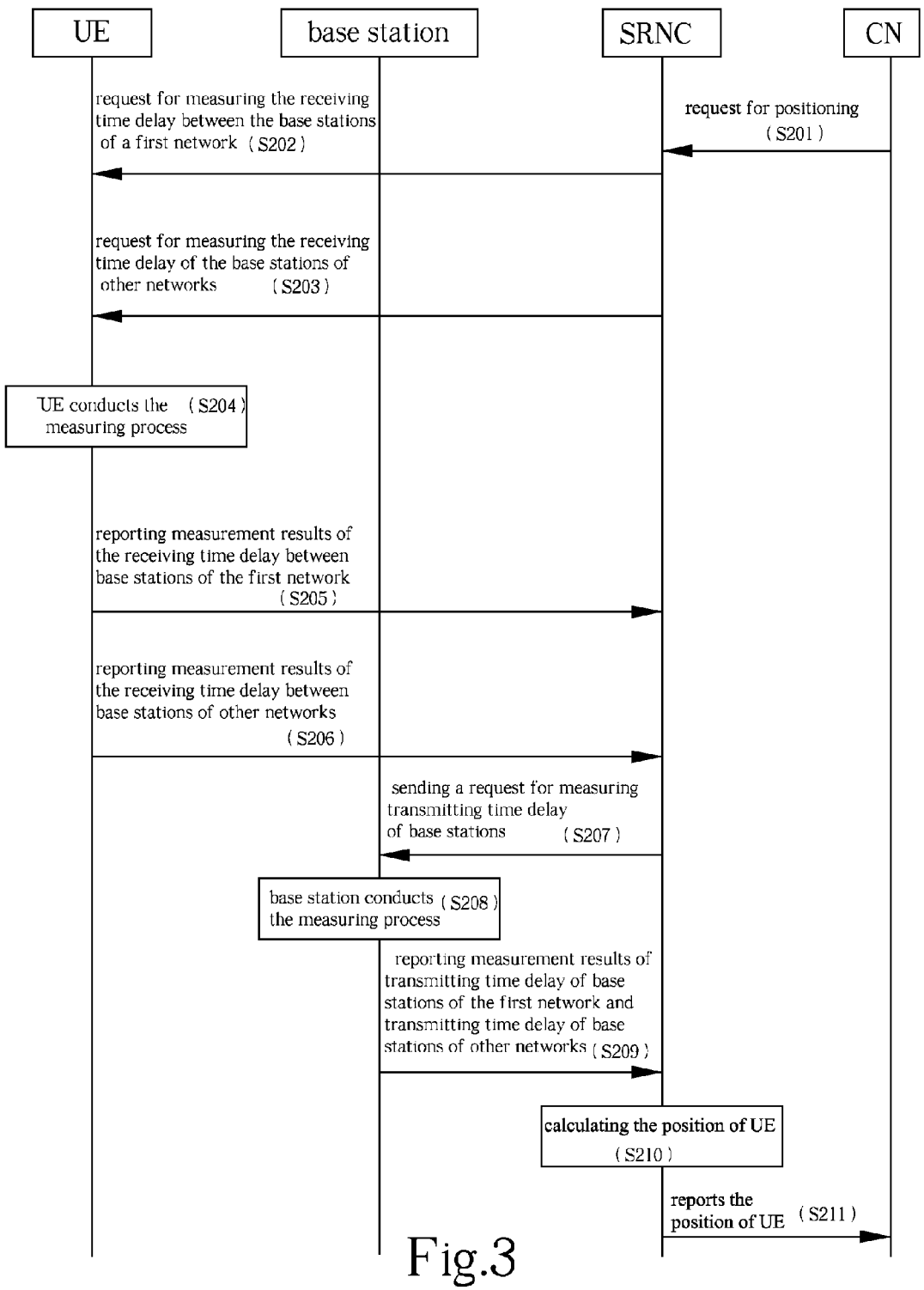
FIG. 3 is a flow chart of positioning technique in two or more networks according to a preferred embodiment of the present invention.

FIG. 3 is a flow chart of the positioning technique in two or more networks. The positioning technique of the present invention is described in detail as follows.

(S201) CN (Core Network) sends a positioning request to SRNC (Serving Radio Network Controller). The SRNC of the present invention can be replaced by an SAS (Stand-Alone Serving Mobile Location Center).

(S202) SRNC sends the measurement control signaling for measuring the receiving time delay between the base stations of a serving network to UE (User Equipment), such as a mobile phone.

(S203) SRNC sends the measurement control signaling for measuring the receiving time delay of the base stations in the other networks to UE.

(S204) UE conducts the measuring process, including the receiving time delay between the base stations of the serving network and the receiving time delay of the base stations of other networks. The network mentioned above may be any cellular network, such as TD-SCDMA, GPRS, and WCDMA systems and so on.

(S205) UE reports measurement results of the receiving time delay $t_1$ to $t_m$ between the base stations of a serving network to SRNC, wherein m is the number of the measured base stations, $t_1=0$ is time delay corresponding to the serving cell, and $t_i$ is time delay of base station number i (i=1, 2, ... m).

(S206) UE reports measurement results of the receiving time delay $t_{o1}$ to $t_{oMo}$ of the base stations of other networks to SRNC, wherein $t_{oi}$ is the time delay of the ith measured base station (i=1, 2, ... Mo).

(S207) SRNC sends the measurement control signaling for measuring the transmission time delay of the base stations to base stations.

(S208) Base stations conducts the measuring process, including the transmitting time delay of the base stations of the serving network and the transmitting time delay of the base stations of other networks.

(S209) Base station reports measurement results of the transmitting time delay $t_{12}$ to $t_{1m}$ of the base stations of the serving network and the transmitting time delay $t_{o12}$ to $t_{o1mo}$ of the base stations of the serving network to SRNC, wherein $t_{1i}$ (i=1, 2, ... m) is a relative time delay of the ith base station with respective to the serving base station in the serving network, and $t_{o1i}$ (i=1, 2, ... mo) is a time delay of the ith base station with respective to the serving base station in other networks respectively.

(S210) SRNC estimates the position of the targeted UE.

(S211) SRNC reports the estimation result to CN.

Figure 4:
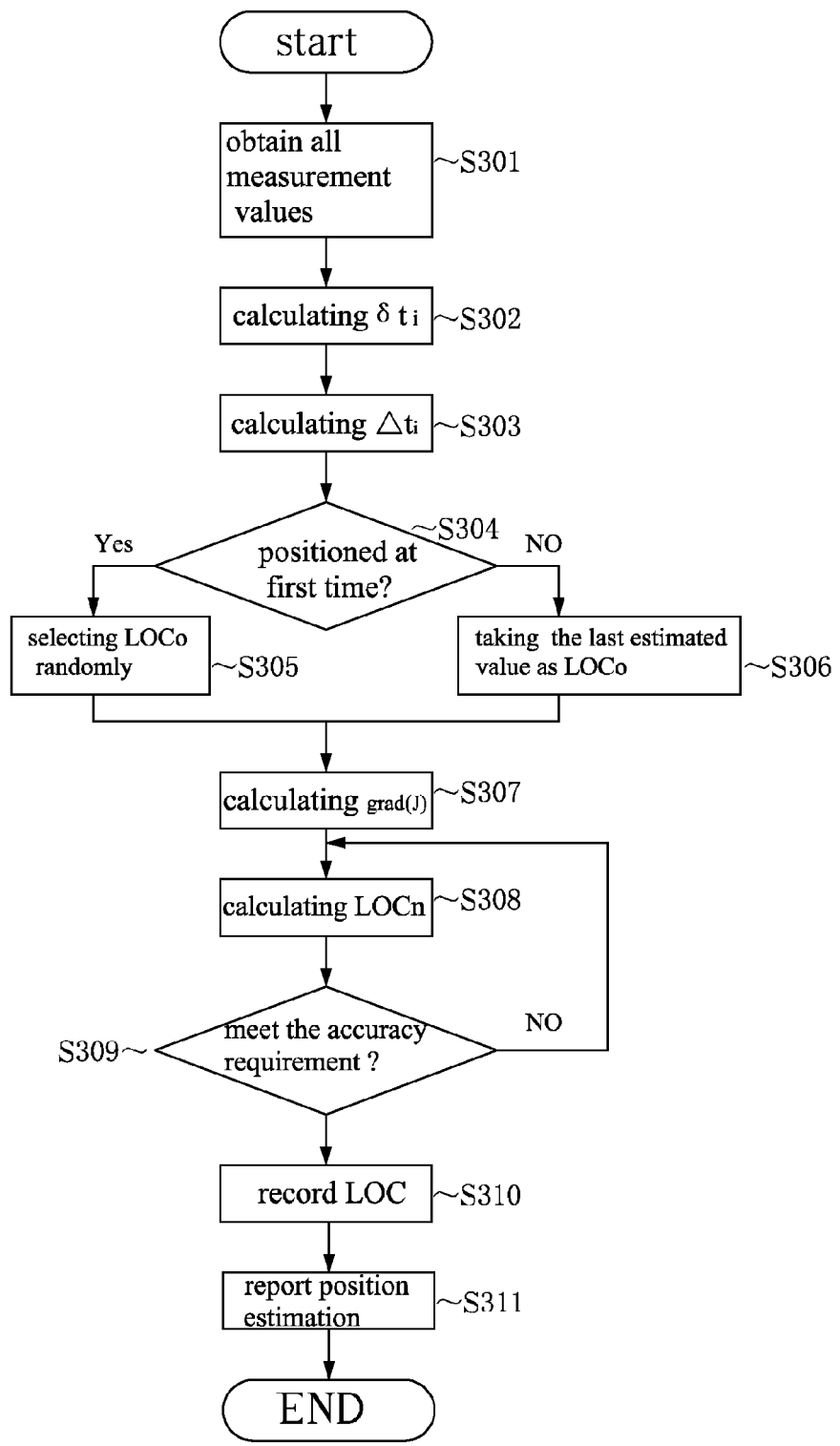
FIG. 4 illustrates a calculation flow for calculating a position of a UE according to the above-preferred embodiment of the present invention.

FIG. 4 illustrates the calculation flow for calculating the position of a UE of the present invention. The calculation flow is described in details as follows.

(S301) obtain all measurement values, including the measurement results obtained from the steps S201 to S211 as shown in FIG. 4.

(S302) calculate time differences of downlink signals between each cell and reference cell in each network: $\delta t_i^j = t_i^j - t_0^j$, wherein j is the number of the network, $t_0^j$ is downlink signal receiving time of the reference cell, $t_i^j$ is the downlink signal receiving time of the ith cell, and $\delta t_i^j$ is the time difference of the two values.

(S303) calculate correction values of time differences of downlink signals between each cell and the reference cell in each network: $\Delta t_i^j = \delta t_i^j - T_{0i}^j$ wherein $T_{0i}^j$ is time difference of downlink signal transmitting time between the ith cell and reference cell in the $j^{th}$ network, and $\Delta t_i^j$ is the correction value of the two values.

(S304) determine whether the mobile phone is positioned for the first time. Yes, enter step S305; No, enter step S306.

(S305) select an initial position LOCO randomly. The initial position is randomly selected in the serving cell where the mobile phone is, such as the center of the cell. Enter S307

(S306) select the position value estimated last time as the initial position LOCO.

(S307) calculate a gradient (grad (J)) of an optimization function for estimating the position of the mobile phone:

$$J = \sum_{j=1}^{N_s} w^j \sum_{i=1}^{N^j} w_i^j [(\|X - X_0^j\| - \|X - X_i^j\|) - c\Delta t_i^j]^2,$$

wherein $X_0^j$ is the position of reference cell of the jth network, Xij is the position of the ith cell of the jth network, $W_i^j$ is the weight directly proportional to the downlink signal receiving intensity of the ith cell of the jth network, $w^j$ is weight inversely proportional to signal code continuing time of the jth network, $\|x-x_0\| = \sqrt{(x-x_0)^2 + (y-y_0)^2 + (z-z_0)^2}$ is the Euclidian distance, $N_j$ is number of non-reference cell of the jth network, $N_s$ is number of networks, c is the speed of light, and the calculation formulas of said gradient is $$grad(J) = \begin{bmatrix} \frac{\partial J}{\partial x} \\ \frac{\partial J}{\partial y} \\ \frac{\partial J}{\partial z} \end{bmatrix}.$$

(S308) calculate $LOC_n$, wherein $Loc_n = Loc_{n-1} - \mu grad(J)$, (n=1, ..., $\mu$ is searching step greater than 0). Calculate $LOC_n$ circularly, that is to say, that calculate $LOC_1$ at the first time, calculate $LOC_2$ at the second time, and so on.

(S309) determine whether $\|LOC_n-LOC_{n-1}\|$ is smaller than a predetermined accuracy requirement based on the result of (S308). When $\|LOC_n-LOC_{n-1}\|$ is smaller than the predetermined accuracy requirement, enter step (S310), or return to step (S308) to calculate the next LOC value.

(S310) record the current LOC value, which is the estimation of the positioning.

(S311) report the LOC value of step (S310) as the estimated position.

Step (307) further comprises pre-steps of setting a weight Wij, wherein Wij is directly proportional to the downlink signal receiving intensity of the ith cell of the jth network; and setting a weight wj, wherein wj is inversely proportional to the signal code continuing time of the jth network.

Because there are different cellular communication networks due to different operators, and historical and economical reason, the above-mentioned positioning technique can be realized. In order to realize international roaming or save phone fee, dual-mode or even multi-mode mobile phone has been developed, which can receive signals from different cellular networks. Different networks have their own base stations, so that a dual-mode or multi-mode mobile phone can measure the base station signal of more than one networks and transmission time delay between them, so as to obtain position estimation with higher accuracy.

Figure 5:
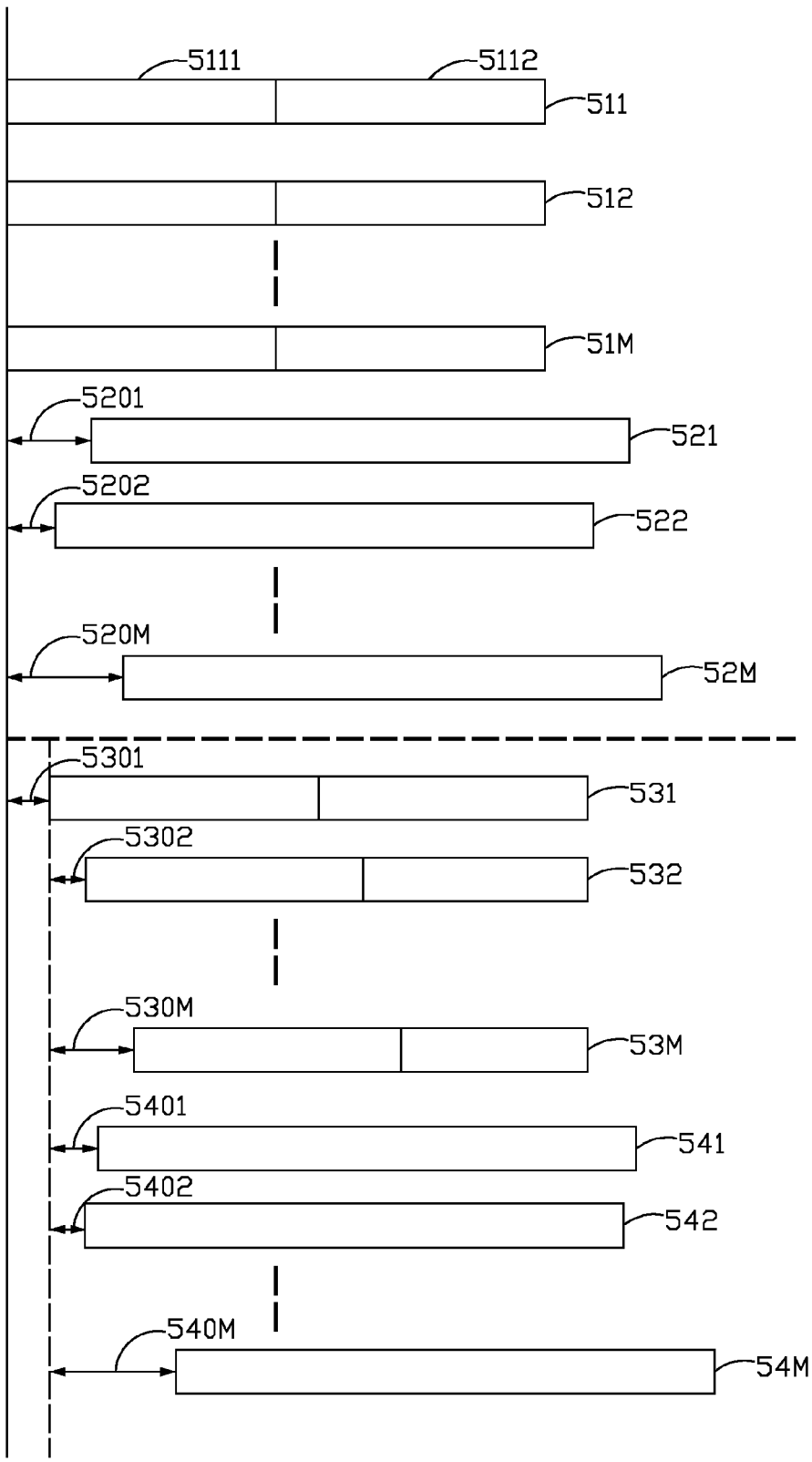
FIG. 5 shows a principle of measuring process of the positioning technique according to the above-preferred embodiment of the present invention.

Taking two 3G networks, WCDMA and TD-SCDMA systems as an example, the measurement of the positioning technique of the present invention is illustrated as follows. Assuming the serving cell is TD-SCDMA. Referring to FIG. 5, at the transmitting end, the serving cell is tagged with 511, which is divided into two sub frames 5111 and 5112, all of which are 5 ms. Other cells of TD-SCDMA are 512 to 51M, each of which is also divided into two sub-frames. All cells of TD-SCDMA are synchronous. The frames 521 to 52Mw of the base stations of WCDMA are 10 ms in length. The frames are not synchronous, and have time delay 5201 to 520Mw with respective to the serving cell. At the receiving end, the mobile phone receives the signals 531 to 53M from the cells of TD-SCDMA, the time delays are 5301 to 530M respectively, wherein 5301 is the time delay of the serving cell. The mobile phone receives the signals 541 to 54Mw from the cells of WCDMA, the time delays are 5401 to 540Mw respectively. The transmission time delay of each base station can be obtained, according to the measured time differences.

Figure 6:
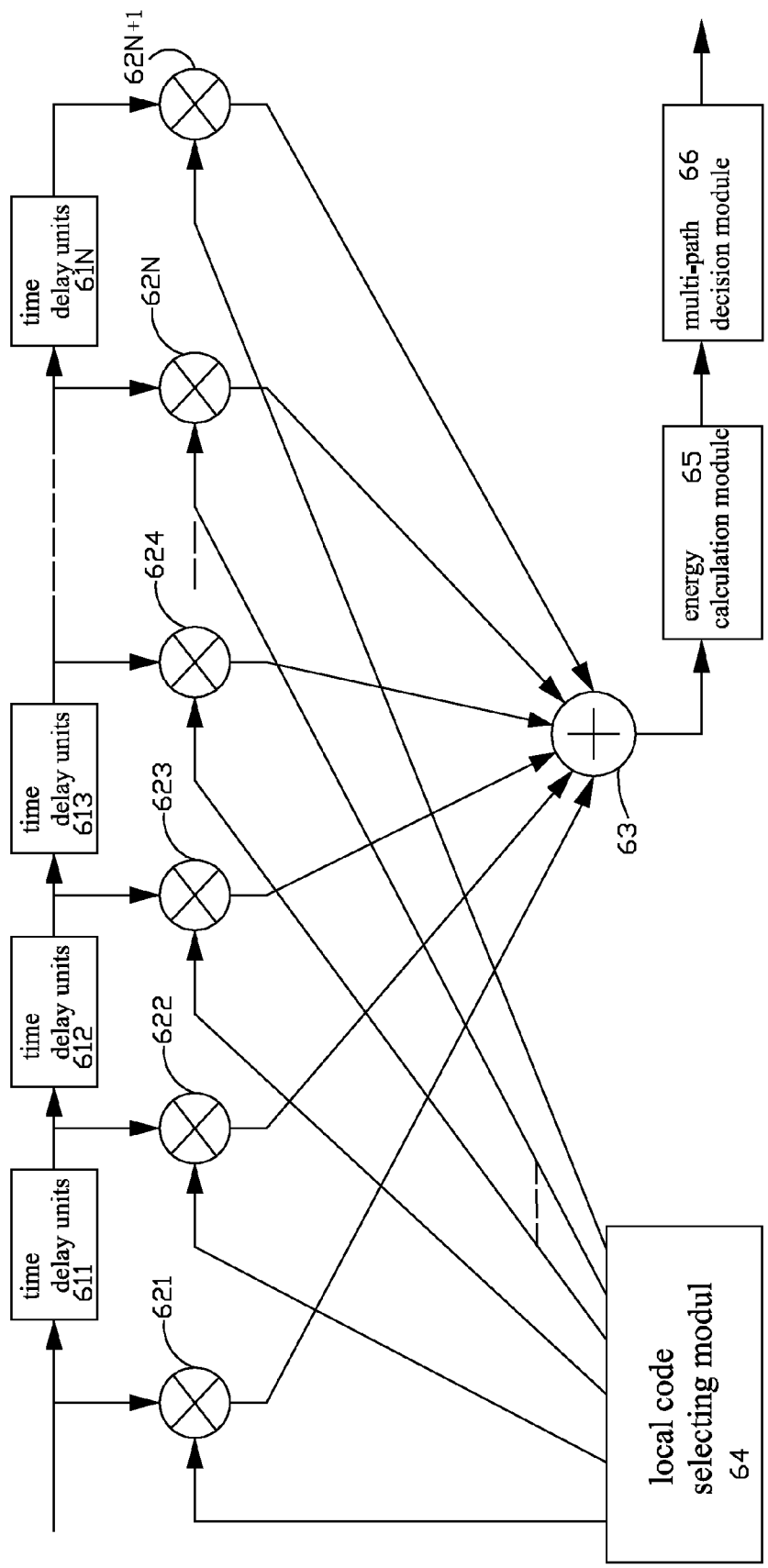
FIG. 6 illustrates a principle of the synchronization capture device in the TD-SCDMA systems and/or in WCDMA systems according to the above-preferred embodiment of the present invention.

FIG. 6 illustrates a principle of the synchronization capture device in TD-SCDMA and WCDMA networks. The time delay units 611 to 61N, multipliers 621 to 62N+1 and an adder 63 constitute a typical matched filter. The local code generation module 64 provides the code for the filter. The local code generation module 64 produces DwPTS (Downlink Pilot Time Slot) in the TD-SCDMA, and produces spreading codes of the base stations. The energy calculation module 65 and multi-path decision module 66 process the output of the filter, and output the multi-path information of the cell.

Figure 7:
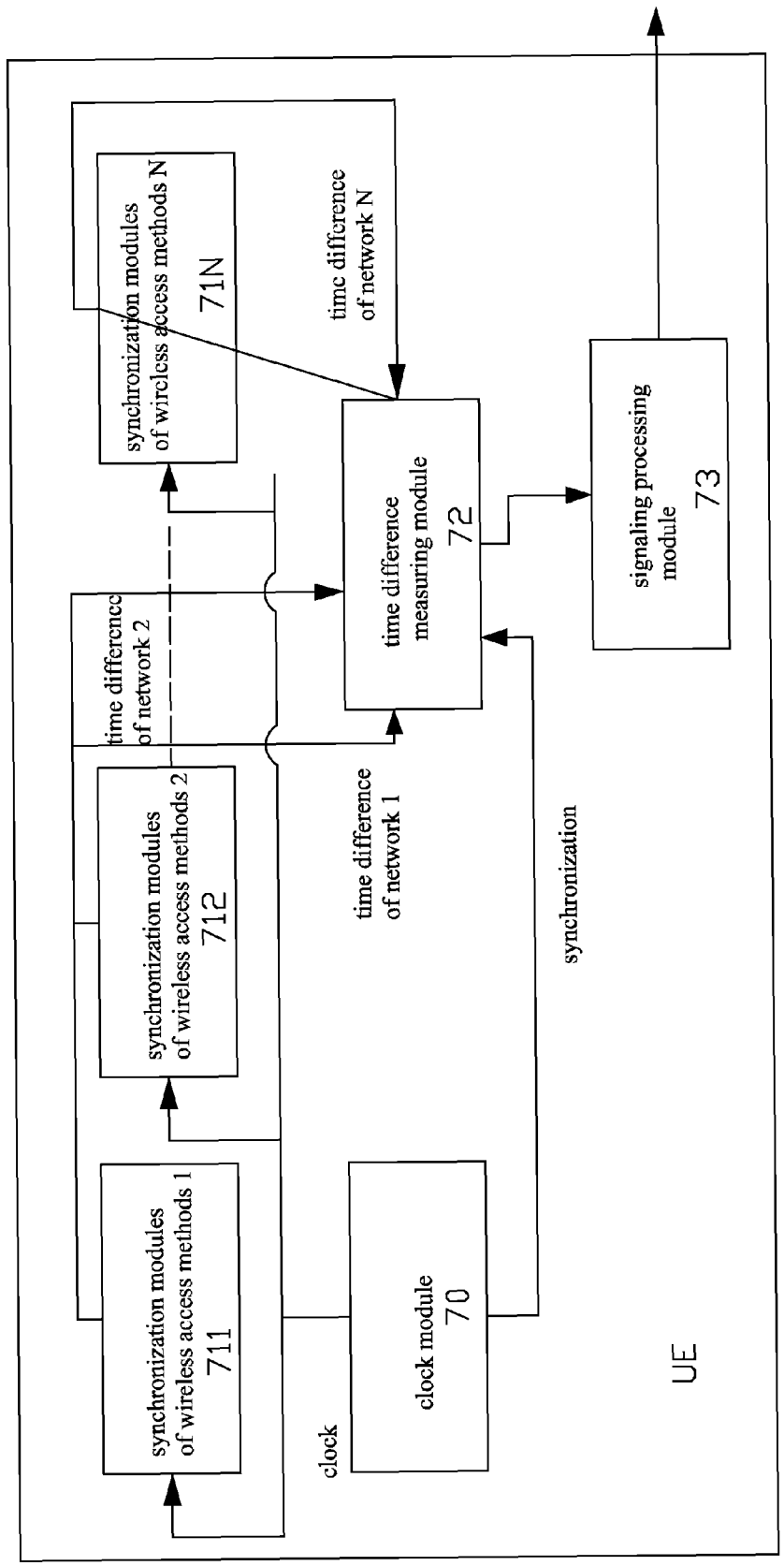
FIG. 7 is a block diagram of a UE of the positioning system according to the above-preferred embodiment of the present invention.

The present invention also discloses a positioning system in two or more cellular networks, comprising a UE (user equipment), BS (base station), SRNC (Serving Radio Network Controller) and CN (core network). Referring FIG. 7 of the drawings, the UE comprises a clock module 70, a plurality of synchronization modules of radio access methods 711 to 71N, a time difference measuring module 72 and a signaling processing module 73. The clock module 70 provides a common timing standard for different networks in UE to measure, and outputs clock signals. The synchronization module 711 of radio access method 1, the synchronization module 712 of radio access method 2 . . . and the synchronization module 71N of radio access method N, receive the clock synchronization signal of the clock module 70 respectively, capture the synchronization of respective radio access method, and output the time difference of the signals of different base stations and the time relative to the clock synchronization signal to the time difference measuring module 72. The time difference measuring module 72 calculates the time difference between the transmission time of all base stations of each network to the mobile phone and that of the reference base station according to the time difference of the signals of different base stations and the time relative to the clock synchronization signal. The result is sent to the signaling processing module 73. The signaling processing module 73 puts the result into signaling and sends it to SRNC as uplink signaling. The mobile phone that has these modules and original modules can be used in the positioning system in two or more cellular networks.

Figure 8:
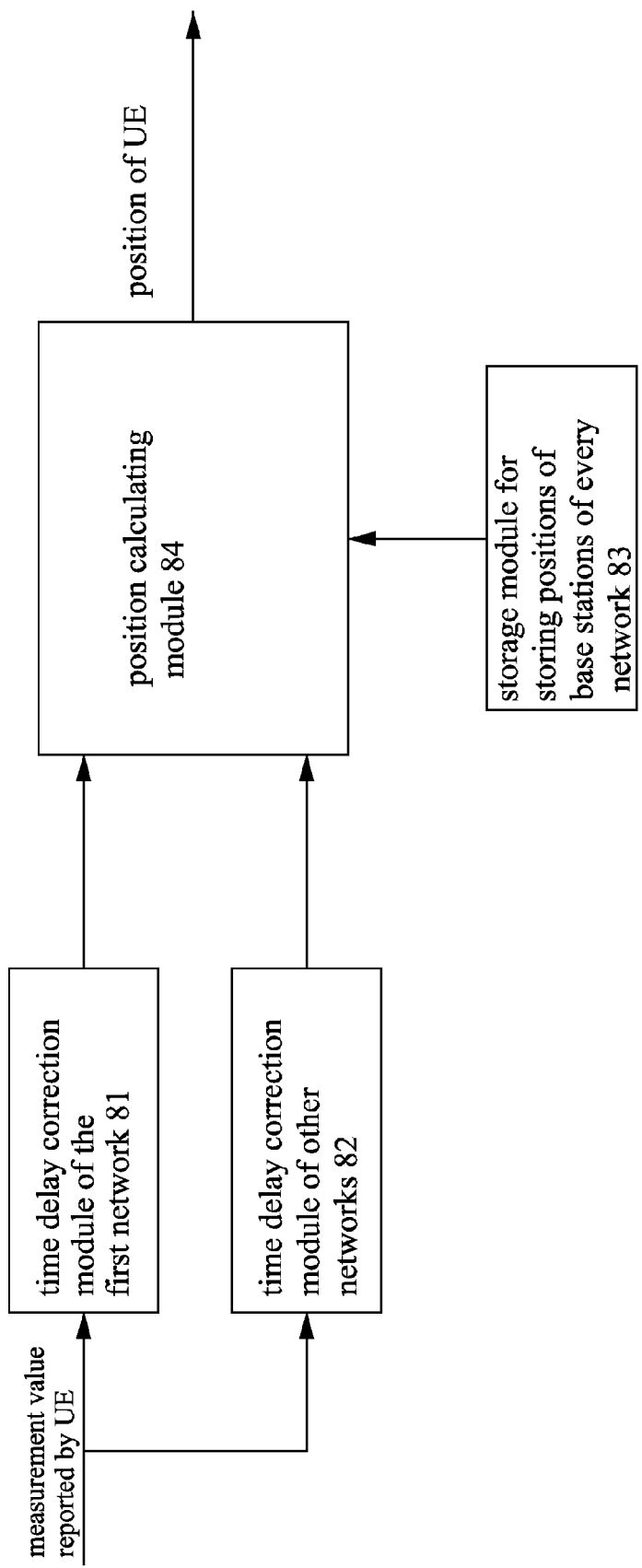
FIG. 8 is a block diagram of a SRNC or SAS of the positioning system according to the above-preferred embodiment of the present invention.

Referring to FIG. 8 of the drawings, SRNC comprises a time delay correction module of the serving network 81, a time delay correction module of other networks 82, a storage module for storing positions of base stations of every network 83, and a position calculating module 84 for calculating a position of a mobile phone. The time delay correction module of the serving network 81 calculates the signal transmission time delay of the respective base station of the serving network according to the time difference reported by UE, and outputs the result to the position estimation module 84. The time delay correction module of other networks 82 calculates the signal transmission time delay of the respective base station of other networks according to the time difference reported by UE, and outputs the calculation result to the position calculating module 84. The storage module 83 stores positions information of base stations of every network. The position calculating module 84 calculates a position estimation of a mobile phone according to the transmission signal time delay of each cell and the position information of base stations of each network, and output the calculation value. The SRNC that has these modules and original modules can be used in the positioning system in two or more cellular networks.

Figure 9:
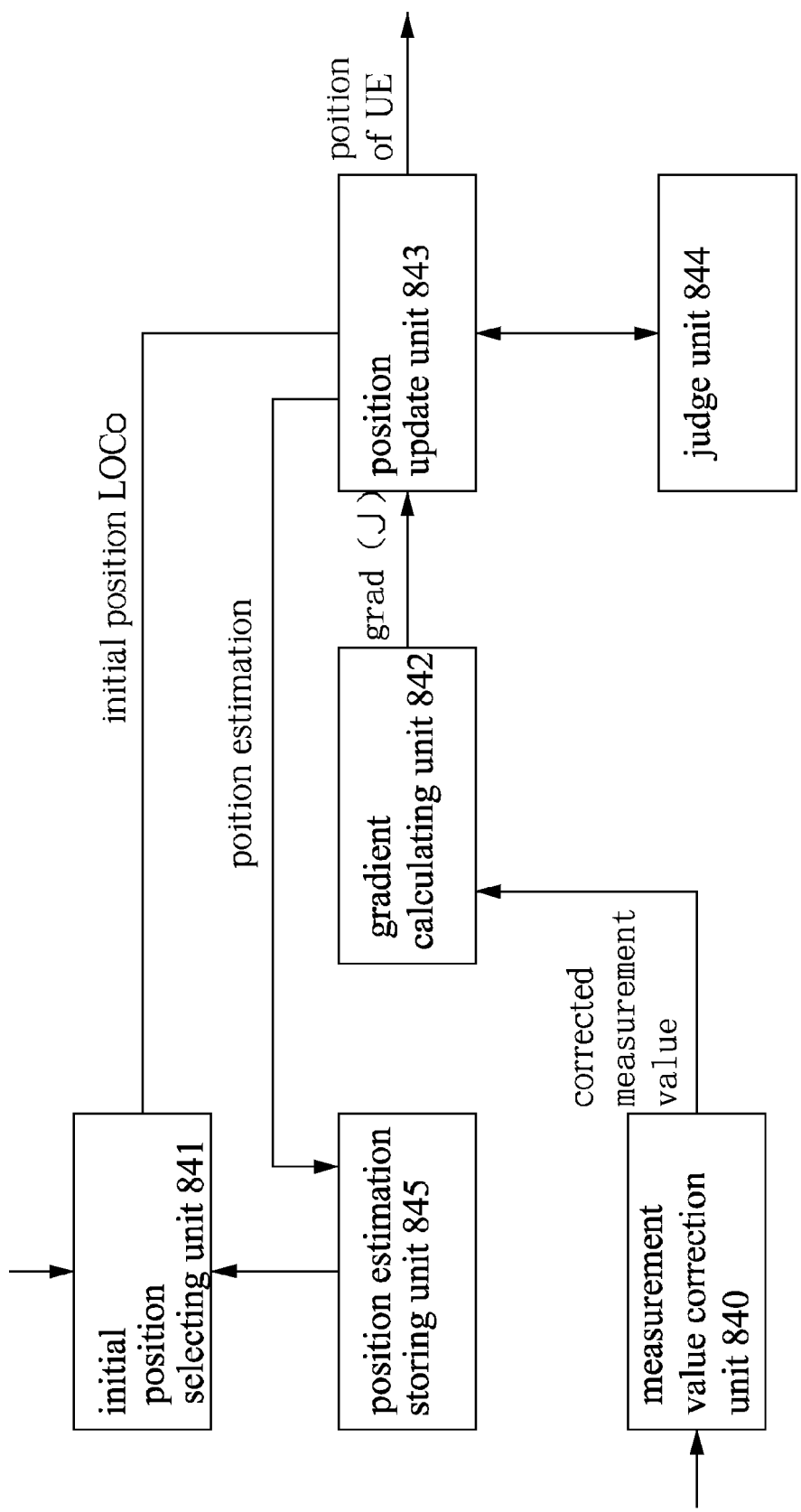
FIG. 9 is a block diagram of a position calculating module of the positioning system according to the above-preferred embodiment of the present invention.

Referring to FIG. 9 of the drawings, the position calculating module 84 comprises a measurement value correction unit 840, an initial position selecting unit 841, a gradient calculating unit 842, a position update unit 843, a judge unit 844, and position estimation storing unit 845.

The measurement value correction unit 840 corrects the reported measurement value. Specifically, firstly calculate the time differences of downlink signals between each cell and the reference cell in each network: $\delta t_i^j = t_i^j - t_0^j$, wherein j is the index of the network, $t_0^j$ is downlink signal receiving time of the reference cell, tij is the downlink signal receiving time of the ith cell, and $\delta t_i^j$ is the time difference of the two values; secondly calculate correction values of time differences of downlink signals between each cell and respective cell in each network: $\Delta t_i^j = \delta t_i^j - T_{0i}^j$ wherein $T_{0i}^j$ is time difference of downlink signal transmitting time between the ith cell and reference cell in the jth network, and $\Delta t_i^j$ is the correction value of the two values.

The initial position selecting unit 841 randomly selects the initial position from the storage module 83 for storing positions of base stations of respective network for the first estimation, which is equal to be randomly selected from the cell where the mobile phone is, and take the last estimation value recorded in the position estimation storing unit 845 as initial position for non-first estimation.

The gradient calculating unit 842 calculates the gradient grad (J), wherein $$grad(J) = \begin{bmatrix} \frac{\partial J}{\partial x} \\ \frac{\partial J}{\partial y} \\ \frac{\partial J}{\partial z} \end{bmatrix}.$$

$$J = \sum_{j=1}^{N_s} w^j \sum_{i=1}^{N_j} w_i^j [(\|X - X_0^j\| - \|X - X_i^j\|) - c\Delta t_i^j]^2,$$

wherein $X_i^j$ is the position of reference cell of the jth network, $X_i^j$ is the position of the ith cell of the jth network, $W_i^j$ is the weight directly proportional to downlink signal receiving intensity of the ith cell of the jth network, $w^j$ is the weight inversely proportional to signal code continuing time of the jth network, $\|x-x_0\| = \sqrt{(x-x_0)^2 + (y-y_0)^2 + (z-z_0)^2}$ is the Euclidian distance, $N^j$ is the number of non-reference cell of the jth network, Ns is the number of networks, c is the speed of light.

The position update unit 843 receives the start value of the position estimation from the initial position selecting unit 841, and the gradient value of the gradient calculating unit 842, so as to update the position estimation. Calculate $Loc_n = Loc_{n-1} - \mu grad(J)$, (n=1, 2 . . . ). When the position update unit 843 is updated, the judge unit 844 judges whether the current position estimation meet the accuracy requirement. If yes, the current value is the final position estimation, and the position update unit 843 outputs the value to the position estimation storing unit 845. If no, the position update unit 843 is updated with next position estimation. The judgment is to determine whether $\|LOC_n - LOC_{n-1}\|$ is smaller than a predetermined accuracy requirement.

The present invention also provides an independent SAS (Stand-Alone Serving Mobile Location Center). Besides the original modules, the SAS further comprises a time delay correction module of the serving network, a time delay correction module of other networks, a storage module for storing positions of base stations of every network, and a position calculating module for calculating the position of a mobile phone. The principle of these modules is same to the above mentioned principle.

One skilled in the art will understand that the embodiment of the present invention as shown in the drawings and described above is exemplary only and not intended to be limiting.

It will thus be seen that the objects of the present invention have been fully and effectively accomplished. Its embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A positioning method in at least two cellular networks, comprising steps of:

sending a positioning request from a core network (CN) to a Serving Radio Network Controller (SRNC) or a Stand-Alone Serving Mobile Location Center (SAS) by a user;

sending a measurement control signaling for measuring receiving time delay between base stations of the serving network from said Serving Radio Network Controller (SRNC) or said Stand-Alone Serving Mobile Location Center (SAS) to a user equipment (UE);

sending a measurement control signaling for measuring a receiving time delay of base stations of other networks from said Serving Radio Network Controller (SRNC) or said Stand-Alone Serving Mobile Location Center (SAS) to said user equipment (UE);

measuring said receiving time delay by said user equipment (UE), including said receiving time delay between said base stations in said serving network and said receiving time delay of said base stations in other networks;

reporting measurement results of said receiving time delay between said base stations of said serving network from said user equipment (UE) to said Serving Radio Network Controller (SRNC) or said Stand-Alone Serving Mobile Location Center (SAS);

reporting measurement results of said receiving time delay between said base stations of other networks from said user equipment (UE) to said Serving Radio Network Controller (SRNC) or said Stand-Alone Serving Mobile Location Center (SAS);

sending a measurement control signaling for measuring a transmitting time delay of said base stations of said serving network and other networks from said Serving Radio Network Controller (SRNC) or said Stand-Alone Serving Mobile Location Center (SAS) to said base stations of said serving network and other networks;

measuring said transmitting time delay by said base stations of said serving network and other networks, including said transmitting time delay of said base stations of said serving network and said transmitting time delay of said base stations of other networks;

reporting measurement results of said transmitting time delay of said base stations of said serving network and said transmitting time delay of said base stations of other networks from said base stations to said Serving Radio Network Controller (SRNC) or said Stand-Alone Serving Mobile Location Center (SAS);

estimating the position of said user equipment (UE) by said Serving Radio Network Controller (SRNC) or said Stand-Alone Serving Mobile Location Center (SAS) in an optimization manner; and reporting the estimation result from said Serving Radio Network Controller (SRNC) or said Stand-Alone Serving Mobile Location Center (SAS) to said core network (CN), wherein step of estimating the position of said user equipment (UE) by said Serving Radio Network Controller (SRNC) or said Stand-Alone Serving Mobile Location Center (SAS) in an optimization manner further comprises steps of:

calculating the time differences of downlink signals between each cell and a reference cell in each network: $\delta t_i^j = t_i^j - t_0^j$, wherein j is the number of said networks, $t_0^j$ is the downlink signal receiving time of said reference cell, $t_i^j$ is the downlink signal receiving time of the $i^{th}$ cell, and $\delta t_i^j$ is time difference between $t_i^j$ and $t_0^j$;

calculating the correction values of time differences of downlink signals between each cell and the reference cell in each network: $\Delta t_i^j = \delta t_i^j - T_{0i}^j$, wherein $T_{0i}^j$ is the time difference of downlink signal transmitting time between the $i^{th}$ cell and the reference cell in the $i^{th}$ network, and $\Delta t^j$ is the correction value of $\delta t_i^j$ and $T_{0i}^j$; and calculating a gradient (grad (J)) of an optimization function for estimating position of said user equipment (UE):

$$J = \sum_{j=1}^{N_s} w^j \sum_{i=1}^{N^j} w_i^j [(\|X - X_0^j\| - \|X - X_i^j\|) - c\Delta t_i^j]^2,$$

wherein $X_0^j$ is the position of reference cell of the $j^{th}$ network, $X_i^j$ is the position of the $i^{th}$ cell of the jth network, $W_i^j$ is the weight directly proportional to downlink signal receiving intensity of the ith cell of the jth network, $w^j$ is the weight inversely proportional to signal code continuing time of the $j^{th}$ network, $\|X-X_0\| = \sqrt{(x-x_0)^2+(y-y_0)^2+(z-z_0)^2}$ is the Euclidian distance, $N^j$ is the number of non-reference cell of the $j^{th}$ network, Ns is the number of networks, c is the speed of light.

2. The positioning method, as recited in claim 1, wherein step of calculating a gradient (grad (J)) of an optimization function for estimating position of said user equipment (UE) further comprises pre-steps of:
setting a weight $W_i^j$, wherein $W_i^j$ is directly proportional to the downlink signal receiving intensity of the ith cell of the jth network; and
setting a weight $w^j$, wherein $w^j$ is inversely proportional to the signal code continuing time of the $j^{th}$ network.

3. The cellular positioning method, as recited in claim 1, wherein the step of estimating the position of said user equipment (UE) by said Serving Radio Network Controller (SRNC) or said Stand-Alone Serving Mobile Location Center (SAS) in an optimization manner further comprises steps of:
selecting an initial position $LOC_0$;
calculating said gradient of $LOC_{n-1}$ $$grad(J) = \begin{bmatrix} \frac{\partial J}{\partial x} \\ \frac{\partial J}{\partial y} \\ \frac{\partial J}{\partial z} \end{bmatrix};$$

calculating $Loc_n = Loc_{n-1} - \mu grad(J)$, (n=1, 2 ..., $\mu$ is searching step greater than 0);
calculating next LOC value, when $\|LOC_n - LOC_{n-1}\|$ is greater than a predetermined accuracy requirement; and
recording $LOC_n$ as the position estimation of user equipment (UE), when $\|LOC_n - LOC_{n-1}\|$ is less than a predetermined accuracy requirement.

4. The cellular positioning method, as recited in claim 3, wherein the step of selecting the position $LOC_0$, further comprises steps of:
randomly selecting said initial position $LOC_0$ in serving cell where said user equipment (UE) is for the first estimation; and
taking the last estimated value as initial position $LOC_0$ for non-first estimation.

5. A positioning calculation method in two or more cellular networks by a Serving Radio Network Controller (SRNC) or a Stand-Alone Serving Mobile Location Center (SAS), comprising steps of:
calculating a time differences of downlink signals between each cell and a reference cell in each network: $\delta t_i^j = t_i^j - t_0^j$, wherein j is the number of said networks, $t_0^j$ is the downlink signal receiving time of said reference cell, $t_i^j$ is the downlink signal receiving time of the $i^{th}$ cell, and $\delta t_i^j$ is the time difference between $t_i^j$ and $t_0^j$;
calculating correction values of the time differences of downlink signals between said each cell and the reference cell in each network: $\Delta t_i^j = \delta t_0^j - T_{0i}^j$, wherein $T_{0i}^j$ is the time difference of downlink signal transmitting time between the $i^{th}$ cell and reference cell in the $j^{th}$ network, and $\Delta t_i^j$ is the correction value of $\delta t_i^j$ and $T_{0i}^j$; and
calculating a gradient (grad (J)) of an optimization function for estimating position of a user equipment (UE):

$$J = \sum_{j=1}^{N_s} w^j \sum_{i=1}^{N^j} w_i^j [(\|X - X_0^j\| - \|X - X_i^j\|) - c\Delta t_i^j]^2,$$

wherein $X_0^j$ is the position of reference cell of the $j^{th}$ network, $X_i^j$ is the position of the $i^{th}$ cell of the $j^{th}$ network, $W_i^j$ is the weight directly proportional to the downlink signal receiving intensity of the $i^{th}$ cell of the $j^{th}$ network, $w^j$ is the weight inversely proportional to signal code continuing time of the $j^{th}$ network, and wherein $\|X-X_0\| = \sqrt{(x-x_0)^2+(y-y_0)^2+(z-z_0)^2}$ is the Euclidian distance, $N^j$ is the number of non-reference cell of the $j^{th}$ network, Ns is the number of networks, c is the speed of light.

6. The positioning calculation method, as recited in claim 5, wherein the step of calculating a gradient (grad (J)) of an optimization function for estimating position of said user equipment (UE) further comprises pre-steps of:
setting a weight $W_i^j$, wherein $W_i^j$ is directly proportional to downlink signal receiving intensity of the ith cell of the jth network; and
setting a weight $w_j$, wherein $w^j$ is inversely proportional to the signal code continuing time of the $j^{th}$ network.

7. The wireless positioning calculation method, as recited in claim 5, wherein the step of estimating the position of said user equipment (UE) by said Serving Radio Network Controller (SRNC) or said Stand-Alone Serving Mobile Location Center (SAS) in an optimization manner further comprises steps of:
selecting an initial position $LOC_0$;
calculating said gradient of $LOC_{n-1}$ $$grad(J) = \begin{bmatrix} \frac{\partial J}{\partial x} \\ \frac{\partial J}{\partial y} \\ \frac{\partial J}{\partial z} \end{bmatrix};$$

calculating $Loc_n = Loc_{n-1} - \mu grad(J)$, (n=1, 2 ..., $\mu$ is searching step greater than 0);
calculating next LOC value, when $\|LOC_n - LOC_{n-1}\|$ is greater than a predetermined accuracy requirement; and
recording $LOC_n$ as position estimation of said user equipment (UE), when $\|LOC_n - LOC_{n-1}\|$ is less than a predetermined accuracy requirement.

8. The wireless positioning calculation method, as recited in claim 7, wherein the step of selecting an initial position $LOC_0$, further comprises steps of:
randomly selecting said initial position $LOC_0$ in the serving cell where said user equipment (UE) is in for first estimation; and
taking last estimated value as initial position $LOC_0$ for non-first estimation.

9. A positioning system in two or more cellular networks, comprising a UE (user equipment), BS (base station), SRNC (Serving Radio Network Controller) or SAS (Stand-Alone Serving Mobile Location Center) and CN (core network) connected one after another, wherein said user equipment (UE) comprises:

a clock module providing a common timing standard for the measurement on different networks;

a plurality of synchronization modules of wireless access methods receiving clock synchronization signal from said clock module respectively, capturing synchronization of respective wireless access methods, and outputting time difference of signals of different base stations and time relative to clock synchronization signal; a time difference measuring module receiving output of said clock module and synchronization modules, calculating a time difference between transmission time of all base stations of each network to the mobile phone and a reference base station, and outputting said time difference; and a signaling processing module putting said time difference into signaling and sending it to said Serving Radio Network Controller (SRNC) or said Stand-Alone Serving Mobile Location Center (SAS) as uplink signaling, wherein said Serving Radio Network Controller (SRNC) or said Stand-Alone Serving Mobile Location Center (SAS) comprises:

a time delay correction module of the serving network calculating signal transmission time delay of base stations of said serving network according to said time difference reported by said user equipment (UE) and outputting a result;

a time delay correction module of other networks calculating signal transmission time delay of base stations of other networks according to said time difference reported by said user equipment (UE) and outputting a result;

a storage module storing positions of base stations of every network; and a position calculating module receiving said results from said time delay correction module of said serving network and said time delay correction module of other networks for calculating a position of said user equipment (UE), and outputting a calculation result;

wherein said position calculating module further comprises:

a measurement value correction unit correcting said time difference reported by said user equipment (UE), and outputting a measurement correction value;

an initial position selecting unit selecting an initial position;

a gradient calculating unit receiving said measurement correction value and calculating a gradient value;

a position update unit receiving said initial position from said initial position selecting unit and said gradient value to update an estimated position;

a judge unit judging whether a current position estimation meets an accuracy requirement, wherein when yes, said current value is a final position estimation, and said judge unit outputs said final position estimation; when no, said position update unit updates said gradient value; and a position estimation storing unit recording said final position estimation;

wherein said measurement value correction unit calculates time differences of downlink signals between each cell and a reference cell in each network: $\delta t_i^j = t_i^j - t_0^j$, wherein j is number of said networks, $t_0^j$ is downlink signal receiving time of said reference cell, $t_i^j$ is downlink signal receiving time of the $i^{th}$ cell, and $\delta t_i^j$ is time difference between $t_i^j$ and $t_0^j$, and calculates correction values of time differences of downlink signals between each cell and reference cell in each network: $\Delta t_i^j = \delta t_i^j - T_{0i}^j$, wherein $T_{0i}^j$ is time difference of downlink signal transmitting time between the $i^{th}$ cell and reference cell in the $j^{th}$ network, and $\Delta t_i^j$ is correction value of $\delta t_i^j$ and $T_{0i}^j$;

wherein said initial position selecting unit randomly selects said initial position in serving cell where said user equipment (UE) is for first estimation; and taking last estimated value as the initial position for non-first estimation;

wherein said gradient calculating unit calculate with a formula $$grad(J) = \begin{bmatrix} \frac{\partial J}{\partial x} \\ \frac{\partial J}{\partial y} \\ \frac{\partial J}{\partial z} \end{bmatrix}$$

wherein $$J = \sum_{j=1}^{N_s} w^j \sum_{i=1}^{N^j} w_i^j [(\|X - X_0^j\| - \|X - X_i^j\|) - c\Delta t_i^j]^2,$$

wherein $X_0^j$ is the position of the reference cell of the $j^{th}$ network, $X_i^j$ is the position of the $i^{th}$ cell of the $j^{th}$ network, $W_i^j$ is the weight directly proportional to downlink signal receiving intensity of the $i^{th}$ cell of the $j^{th}$ network, $w^j$ is the weight inversely proportional to the signal code continuing time of the $j^{th}$ network, and wherein $\|X-X_0\|= \sqrt{(x-x_0)^2+(y-y_0)^2+(z-z_0)^2}$ is the Euclidian distance, $N^j$ is the number of non-reference cell of the $j^{th}$ network, Ns is the number of networks, c is the speed of light;

wherein said position update unit updates an estimated position according to a formula $Loc_n = Loc_{n-1} - \mu grad(J)$, (n=1, 2 ..., µ is searching step larger than 0);

wherein said judge unit judges whether $\|LOC_n - LOC_{n-1}\|$ being larger than a predetermined accuracy.

10. A position calculating module for positioning system in two or more cellular networks, comprising:

a measurement value correction unit correcting a time difference reported by a user equipment (UE), and outputting a measurement correction value;

an initial position selecting unit selecting an initial position;

a gradient calculating unit receiving said measurement correction value and calculating a gradient value;

a position update unit receiving said initial position from said initial position selecting unit and said gradient value to update an estimated position;

a judge unit judging whether a current position estimation meets an accuracy requirement, wherein when yes, said current value is a final position estimation, and said judge unit outputs said final position estimation; when no, said position update unit updates said gradient value; and a position estimation storing unit recording said final position estimation;

wherein said measurement value correction unit calculates the time differences of downlink signals between each cell and a reference cell in each network: $\delta t_i^j = t_i^j - t_0^j$, wherein j is the index of said networks, $t_0^j$ is the downlink signal receiving time of said reference cell, $t_i^j$ is the downlink signal receiving time of the $i^{th}$ cell, and $\delta t_i^j$ is the time difference between $t_i^j$ and $t_0^j$, and calculates correction values of time differences of downlink signals between each cell and reference cell in each network: $\Delta t_i^j = \delta t_i^j - T_{0i}^j$, wherein $T_{0i}^j$ is the time difference of the downlink signal transmitting time between the $i^{th}$ cell and the reference cell in the $j^{th}$ network, and $\Delta t_i^j$ is the correction value of $\delta t_i^j$ and $T_{0i}^j$.

11. The positioning system in two or more cellular networks, as recited in claim 10, wherein said initial position selecting unit randomly selects said initial position in serving cell where said user equipment (UE) is for first estimation; and taking last estimated value as initial position for non-first estimation.

12. The positioning system in two or more cellular networks, as recited in claim 11, wherein said gradient calculating unit calculates with a formula $$grad(J) = \begin{bmatrix} \frac{\partial J}{\partial x} \\ \frac{\partial J}{\partial y} \\ \frac{\partial J}{\partial z} \end{bmatrix}$$

wherein $$J = \sum_{j=1}^{N_s} w^j \sum_{i=1}^{N^j} w_i^j [(\|X - X_0^j\| - \|X - X_i^j\|) - c\Delta t_i^j]^2,$$

wherein $X_0^j$ is the position of reference cell of the $j^{th}$ network, $X_i^j$ is the position of the $i^{th}$ cell of the $j^{th}$ network, $W_i^j$ is the weight directly proportional to the downlink signal receiving intensity of the ith cell of the $j^{th}$ network, $w^j$ is the weight inversely proportional to signal code continuing time of the $j^{th}$ network, $\|X - X_0\| = \sqrt{(x-x_0)^2 + (y-y_0)^2 + (z-z_0)^2}$ is the Euclidian distance, $N^j$ is the number of non-reference cell of the jth network, Ns is the number of networks, c is the speed of light.

13. The positioning system in two or more cellular networks, as recited in claim 12, wherein said position update unit updates a estimated position according to a formula $Loc_n = Loc_{n-1} - \mu grad(J)$, (n=1, 2 ..., $\mu$ is searching step greater than 0).

14. The positioning system in two or more cellular networks, as recited in claim 13, wherein said judge unit judges whether $\|LOC_n - LOC_{n-1}\|$ being greater than a predetermined accuracy.

15. A Serving Radio Network Controller (SRNC) for positioning system in two or more cellular networks, comprising original modules, and further comprising:

a time delay correction module of the serving network calculating signal transmission time delay of base stations of said serving network according to said time difference reported by a user equipment (UE) and outputting a result;

a time delay correction module of other networks calculating signal transmission time delay of base stations of other networks according to said time difference reported by said user equipment (UE) and outputting a result;

a storage module storing positions of base stations of every network; and a position calculating module receiving said results from said time delay correction module of said serving network and said time delay correction module of other networks for calculating a position of said user equipment (UE), and outputting a calculation result;

wherein said position calculating module further comprises:

a measurement value correction unit correcting said time difference reported by said user equipment (UE), and outputting a measurement correction value;

an initial position selecting unit selecting a initial position;

a gradient calculating unit receiving said measurement correction value and calculating a gradient value;

a position update unit receiving said initial position from said initial position selecting unit and said gradient value to update an estimated position;

a judge unit judging whether a current position estimation meets an accuracy requirement, wherein when yes, said current value is a final position estimation, and said judge unit outputs said final position estimation; when no, said position update unit updates said gradient value; and a position estimation storing unit recording said final position estimation;

wherein said measurement value correction unit calculates time differences of downlink signals between each cell and a reference cell in each network: $\delta t_i^j = t_i^j - t_0^j$, wherein j is the index of said networks, $t_0^j$ is the downlink signal receiving time of said reference cell, is the downlink signal receiving time of the $i^{th}$ cell, and $\delta t_i^j$ is the time difference between $t_i^j$ and $t_0^j$, and calculates correction values of time differences of downlink signals between each cell and reference cell in each network: $\Delta t_i^j = \delta t_i^j - T_{0i}^j$, wherein $T_{0i}^j$ is the time difference of downlink signal transmitting time between the $i^{th}$ cell and reference cell in the $j^{th}$ network, and $\Delta t_i^j$ is the correction value of $\delta t_i^j$ and $T_{0i}^j$;

wherein said initial position selecting unit randomly selects said initial position in the serving cell where said user equipment (UE) is for the first estimation; and taking last estimated value as initial position for non-first estimation;

wherein said gradient calculating unit calculate with a formula $$grad(J) = \begin{bmatrix} \frac{\partial J}{\partial x} \\ \frac{\partial J}{\partial y} \\ \frac{\partial J}{\partial z} \end{bmatrix}$$

wherein $$J = \sum_{j=1}^{N_s} w^j \sum_{i=1}^{N^j} w_i^j [(\|X - X_0^j\| - \|X - X_i^j\|) - c\Delta t_i^j]^2,$$

wherein $X_0^j$ is the position of reference cell of the $j^{th}$ network, $X_i^j$ is the position of the $i^{th}$ cell of the $j^{th}$ network, $W_i^j$ is the weight directly proportional to downlink signal receiving intensity of the $i^{th}$ cell of the $j^{th}$ network, $w^j$ is the weight inversely proportional to the signal code continuing time of the $j^{th}$ network, $\|X-X_0\|=\sqrt{(x-x_0)^2+(y-y_0)^2+(z-z_0)^2}$ is the Euclidian distance, $N^j$ is the number of non-reference cell of the $j^{th}$ network, Ns is the number of networks, c is the speed of light;

wherein said position update unit updates a estimated position according to a formula $Loc_n=Loc_{n-1}-\mu grad(J)$, (n=1, 2 ..., $\mu$ is searching step larger than 0);

wherein said judge unit judges whether $\|LOC_n-LOC_{n-1}\|$ being greater than a predetermined accuracy.

16. Stand-Alone Serving Mobile Location Center (SAS) for positioning system in two or more cellular networks, comprising original Stand-Alone Serving Mobile Location Center (SAS) modules, and further comprising:

a time delay correction module of the serving network calculating signal transmission time delay of base stations of said serving network according to said time difference reported by a user equipment (UE) and outputting a result;

a time delay correction module of other networks calculating signal transmission time delay of base stations of other networks according to said time difference reported by said user equipment (UE) and outputting a result;

a storage module storing positions of base stations of every network; and a position calculating module receiving said results from said time delay correction module of said serving network and said time delay correction module of other networks for calculating a position of said user equipment (UE), and outputting a calculation result;

wherein said position calculating module further comprises:

a measurement value correction unit correcting said time difference reported by said user equipment (UE), and outputting a measurement correction value;

an initial position selecting unit selecting an initial position;

a gradient calculating unit receiving said measurement correction value and calculating a gradient value;

a position update unit receiving said initial position from said initial position selecting unit and said gradient value to update an estimated position;

a judge unit judging whether a current position estimation meets an accuracy requirement, wherein when yes, said current value is a final position estimation, and said judge unit outputs said final position estimation; when no, said position update unit updates said gradient value; and a position estimation storing unit recording said final position estimation;

wherein said measurement value correction unit calculates time differences of downlink signals between each cell and a reference cell in each network: $\delta t_i^j = t_i^j - t_0^j$, wherein j is the index of said networks, $t_0^j$ is the downlink signal receiving time of said reference cell, $t_i^j$ is the downlink signal receiving time of the $i^{th}$ cell, and $\delta t_i^j$ is the time difference between $t_i^j$ and $t_0^j$, and calculates correction values of the time differences of downlink signals between each cell and the reference cell in each network: $\Delta t_i^j = \delta t_i^j - T_{0i}^j$, wherein $T_{0i}^j$ is the time difference of the downlink signal transmitting time between the $i^{th}$ cell and the reference cell in the $j^{th}$ network, and $\Delta t_i^j$ is the correction value of $\delta t_i^j$ and $T_{0i}^j$;

wherein said initial position selecting unit randomly selects said initial position in the serving cell where said user equipment (UE) is for the first estimation; and taking the last estimated value as initial position for non-first estimation;

wherein said gradient calculating unit calculate with a formula $$grad(J) = \begin{bmatrix} \frac{\partial J}{\partial x} \\ \frac{\partial J}{\partial y} \\ \frac{\partial J}{\partial z} \end{bmatrix}$$

wherein $$J = \sum_{j=1}^{N_S} w^j \sum_{i=1}^{N^j} w_i^j [(\|X-X_0^j\| - \|X-X_i^j\|) - c\Delta t_i^j]^2,$$

wherein $X_0^j$ is the position of the reference cell of the $j^{th}$ network, $X_i^j$ is the position of the $i^{th}$ cell of the $j^{th}$ network, $W_i^j$ is the weight directly proportional to downlink signal receiving intensity of the $i^{th}$ cell of the $j^{th}$ network, $w^j$ is the weight inversely proportional to the signal code continuing time of the $j^{th}$ network, $\|X-X_0\|=\sqrt{(x-x_0)^2+(y-y_0)^2+(z-z_0)^2}$ is the Euclidian distance, $N^j$ is the number of non-reference cell of the $j^{th}$ network, Ns is the number of networks, c is the speed of light;

wherein said position update unit updates an estimated position according to a formula $Loc_n=Loc_{n-1}-\mu grad(J)$, (n=1, 2 ..., $\mu$ is searching step larger than 0);

wherein said judge unit judges whether $\|LOC_n-LOC_{n-1}\|$ being greater than a predetermined accuracy.

* * * * *